(12) United States Patent
Manzano (10) Patent No.: US 7,437,733 B2
(45) Date of Patent: Oct. 14, 2008

(54) SYSTEM AND METHOD FOR USING A MOBILE AGENT OBJECT TO COLLECT DATA

(75) Inventor: Michael R. Manzano, Seattle, WA (US)

(73) Assignee: Topia Technology, Inc., Tacoma, WA (US)

( * ) Notice: Subject to any disclaimer, the term of this patent is extended or adjusted under 35 U.S.C. 154(b) by 657 days.

(21) Appl. No.: 10/630,637

(22) Filed: Jul. 29, 2003

(65) Prior Publication Data

US 2004/0078800 A1    Apr. 22, 2004

Related U.S. Application Data

(60) Provisional application No. 60/399,504, filed on Jul. 29, 2002.

(51) Int. Cl.
*G06F 9/54* (2006.01)
*G06F 9/46* (2006.01)

(52) U.S. Cl. .................. 719/315; 719/317; 718/100; 709/202; 709/223

(58) Field of Classification Search .......... 719/315, 719/317; 718/100; 709/202, 223
See application file for complete search history.

(56) References Cited

U.S. PATENT DOCUMENTS

| | | | | |
|---|---|---|---|---|
| 6,233,601 B1 * | 5/2001 | Walsh | .................. | 709/202 |
| 6,650,890 B1 * | 11/2003 | Irlam et al. | ............... | 455/412.1 |
| 6,668,284 B1 * | 12/2003 | Parkhurst | .................... | 719/313 |
| 7,010,303 B2 * | 3/2006 | Lewis et al. | ................. | 455/445 |
| 7,069,560 B1 * | 6/2006 | Cheyer et al. | ............... | 719/317 |
| 7,082,604 B2 * | 7/2006 | Schneiderman | ............. | 718/100 |
| 2002/0019886 A1 * | 2/2002 | Sanghvi et al. | ............. | 709/318 |
| 2002/0078277 A1 * | 6/2002 | Mohindra et al. | ........... | 710/100 |
| 2002/0133554 A1 * | 9/2002 | Checkoway et al. | ......... | 709/206 |
| 2003/0037181 A1 * | 2/2003 | Freed | .......................... | 709/328 |
| 2003/0041178 A1 * | 2/2003 | Brouk et al. | ................. | 709/313 |

OTHER PUBLICATIONS

Alexander Schill. "An agent based application for personalized vehicular traffic management", p. 99-111, 1998, ISBN: 3-540-64959-X.*

Meta Group; Loose Leaf Manual; Mobile Agent Technology and Market Positioning; Feb. 2001; pp. 2-31.

* cited by examiner

*Primary Examiner*—Meng-Ai An
*Assistant Examiner*—Abdou K Seye
(74) *Attorney, Agent, or Firm*—P. G. Scott Born; Black Lowe & Graham (57) ABSTRACT

Method and system for collecting and filtering messages received at an event source platform and delivering the filtered messages to a collection host platform. According to one embodiment, the system uses a mobile agent object to filter messages received at an event source platform. The mobile agent object determines a filtered set of messages that match predetermined parameters and then delivers the filtered messages to a collection host platform for storage or redirection.

41 Claims, 5 Drawing Sheets

SYSTEM AND METHOD FOR USING A MOBILE AGENT OBJECT TO COLLECT DATA

CROSS REFERENCE TO RELATED APPLICATION

This application claims the benefit of co-pending Provisional Patent Application Ser. No. 60/399,504 filed Jul. 29, 2002 entitled "Using Mobile Agents to Collect Information Pushed From a Host System to a Mobile Communication Device."

TECHNICAL FIELD OF THE INVENTION

The present invention relates, generally, to a distributed computing environment wherein processes created in an object-oriented environment direct their own movement throughout a computer network, and, in particular, relates to the use of mobile agent objects for the collection of data amongst various operating platforms.

BACKGROUND OF THE INVENTION

The advent of computer networks has proliferated the use of distributed-computing environments. A distributed-computing environment is a type of computing wherein several computer platforms, i.e., different computers, coupled by a network, perform separate but related tasks, (called a process), that are directed in concert toward a single achievement. One example of such a process is the retrieval of all files in a network having the same pattern of letters in the file name. By taking advantage of the computing power of several computers at once, tasks require less time for completion. Use of a processor close to resources to be processed reduces total computing resource requirements.

One method known in the art for practicing a distributed-computing environment is called "remote programming." In remote programming, a first executing program, called a client process, executing on a first computer system, sends to a second process, called a server process executing on the second computer system, a list of instructions. The instructions are then carried out on the second computer system by the server process, effectuating the goal of the client process. The instructions which the server process is designed to carry out must have some degree of generality, i.e., the instructions must allow some degree of local decision-making with respect to details.

U.S. Pat. No. 6,016,393 to White et al., entitled, "System and Method for Distributed Computation Based upon the Movement, Execution, and Interaction of Processes in a Network", which is hereby incorporated by reference, discloses a system that improves upon the concept of remote programming by utilizing processes called mobile agents (sometimes referred to as mobile objects or agent objects). The system described by White et al., provides the ability for an object (the mobile agent object), existing on a first ("host") computer system, to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded", to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations of any complexity, including defining, creating, and manipulating data objects and interacting with other remote host computer objects. Since mobile agent objects are known in the prior art, they will not be discussed further herein.

Computer systems are often used to send and receive messages between a sender and a receiver. Examples of computer systems or platforms that facilitate the communication of messages include electronic mail via POP3 e-mail accounts, voice-mail over wireless networks, text messaging between two personal computer platforms, and many others. Messages on computer networks are often delivered to users via multiple unrelated communications channels, and often to different destination locations that can only be accessed locally by the user. Furthermore, each destination can typically only be accessed one at a time. Additionally, the messages that are sent to the user may not be messages the user wishes to receive, such as spam email. An automated method and system for the filtration, collection, and consolidation of important messages from different destination points is desirable.

One such system is described in U.S. Pat. No. 6,389,457 to Lazaridis et al., entitled "System and Method for Pushing Information From a Host System to a Mobile Data Communication Device" which is incorporated by reference.

The system described by Lazaridis et al., involves placing a "redirector program" on a host machine ("collection host") that is configurable by a user. Messages to the user are pushed to a user's mobile device by the redirector program based on user-defined event triggers set up within the redirector program. An event can be any exceptional occurrence within the collection host. Furthermore, whether a message is pushed to the user's mobile device or ignored can be a function of the message type, message contents, and any one of a number of preset filters available to the redirector program.

Although this system provides the user the ability to filter messages, the ability to filter is limited to what filters are available to the redirector program. Furthermore, the system of Lazaridis et al. does not disclose a method for filtration of the messages at the message source platform and the subsequent redirection and delivery of the filtered messages other than conventional e-mail methods such as POP3. That is, all messages are sent to a single host platform prior to being filtered for parameters, such as content, time and date stamp, etc. By not filtering unwanted messages at the source of the message, unnecessary traffic is placed on a computer network prior to filtration.

SUMMARY OF THE INVENTION

The present invention is directed to a method and system for collecting and filtering messages at an event source platform and delivering the filtered messages to a collection host platform. According to one embodiment, the method uses a mobile agent object to filter messages received at an event source platform. The mobile agent object determines a filtered set of messages that match predetermined parameters and then delivers the filtered messages to a collection host platform.

Thus, in comparison to Lazaridis et al., instead of a fixed redirector program in the collection host platform, the ability to dynamically deliver a filtered set of messages from an event source platform through a mobile agent object to the collection host platform is realized. In addition to placing mobile agent objects in the event source platforms, similar mobile agent objects may be placed in the collection host platforms for redirecting the filtered messages to a plurality of different device platforms, such as a display device platform or a control device platform.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
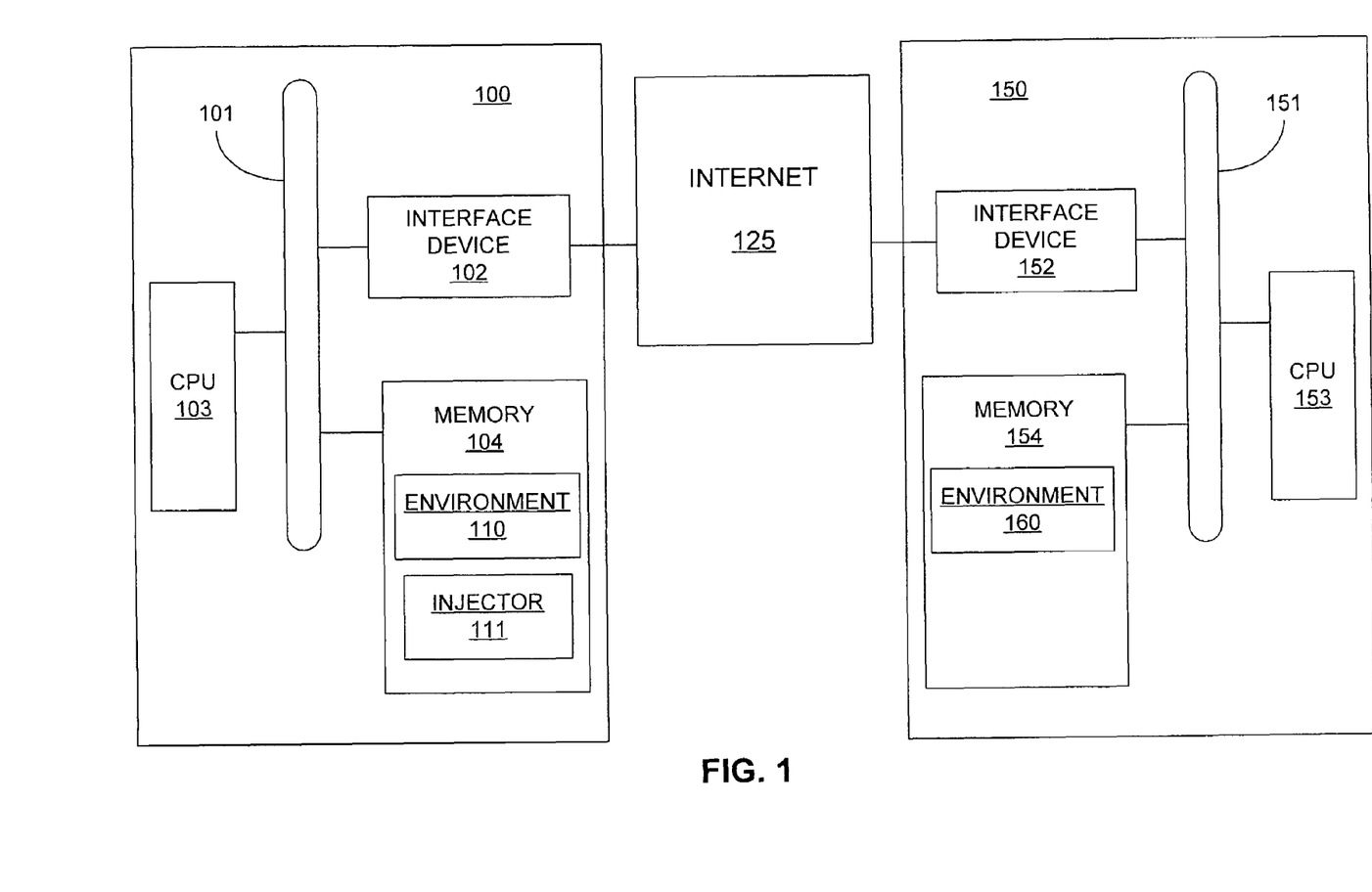
FIG. 1 is a block diagram of one embodiment of distributed-computing environment suitable for practicing embodiments of the invention.

FIG. 1 is a block diagram of a distributed-computing environment suitable for practicing embodiments of the invention. The distributed-computing environment includes a first computer system 100 and a second computer system 150 that are coupled by a network connection, such as the internet 125 as shown in FIG. 1. The network connection may be any other connection, such as a Local Area Network (LAN) for example, that is suitable for facilitating communication between computer systems. Here, the first 100 and second 150 computer systems may communicate over the internet 125 using a standard protocol, such as, for example, Transmission Control Protocol/Internet Protocol (TCP/IP). Additionally, there are typically many more computer systems (not shown) coupled with the internet 125, all of which may communicate with other computers on the network including the first and second computers 100 and 150.

The first computer system 100 includes a CPU 103 coupled to a bus 101 that facilitates communication between the CPU 103 and other components of the computer 100. Other components of the computer 100 include a Network Interface Component 102 (NIC) and a memory 104. The memory may include magnetic or optical disks, Random-Access memory (RAM), Read-Only memory (ROM), Basic Input/Output Systems (BIOS), or any other commonly known memory system used in computer architecture. In the first computer 100, a mobile-agent runtime environment 110 and a mobile agent injector program 111 are resident within the memory 104. Although shown as separate memory components, the mobile-agent runtime environment 110 and a mobile agent injector program 111 may reside in a single memory component or in any combination of memory components that are coupled with the bus 101. The NIC 102 facilitates communications between the first computer 100 and other computers, such as the second computer 150, via the internet 125.

The second computer 150 is similar to the first computer 100 and includes a CPU 153, a bus 151, a NIC 152, and a memory 154 which includes a mobile-agent runtime environment 160. These components are organized and coupled as described above with respect the first computer 100.

The above-described distributed-computing environment may host one or more mobile agent objects (not shown) that are present in one of the mobile-agent runtime environments 110 or 160 of one of the computers 100 or 150. The mobile-agent runtime environment 110 and 160 is a portion of the memory dedicated to allowing a mobile agent object the ability to perform operations that it was programmed to carry out. The nature of the mobile agent object, the manner in which the mobile agent object is transported between computers, and the parameters of the mobile agent object's abilities are discussed in detail in White et al. (which has been incorporated by reference) and will not be discussed further herein.

Mobile agent objects may be instantiated in a mobile-agent runtime environment 110 or 160 in several ways, two of which are briefly described here. In a first way, the mobile agent object is locally created in the first computer 100 and then locally injected into the mobile-agent runtime environment 110 by the mobile agent injector program 111. In a second way, the mobile agent object moves from the mobile-agent runtime environment 110 of the first computer system 100 to the mobile-agent runtime environment 160 of the second computer system 150 over the internet 125 by its own accord, i.e., according to its programmed instructions. Both of these instantiation processes are well known in the prior art.

Figure 2:
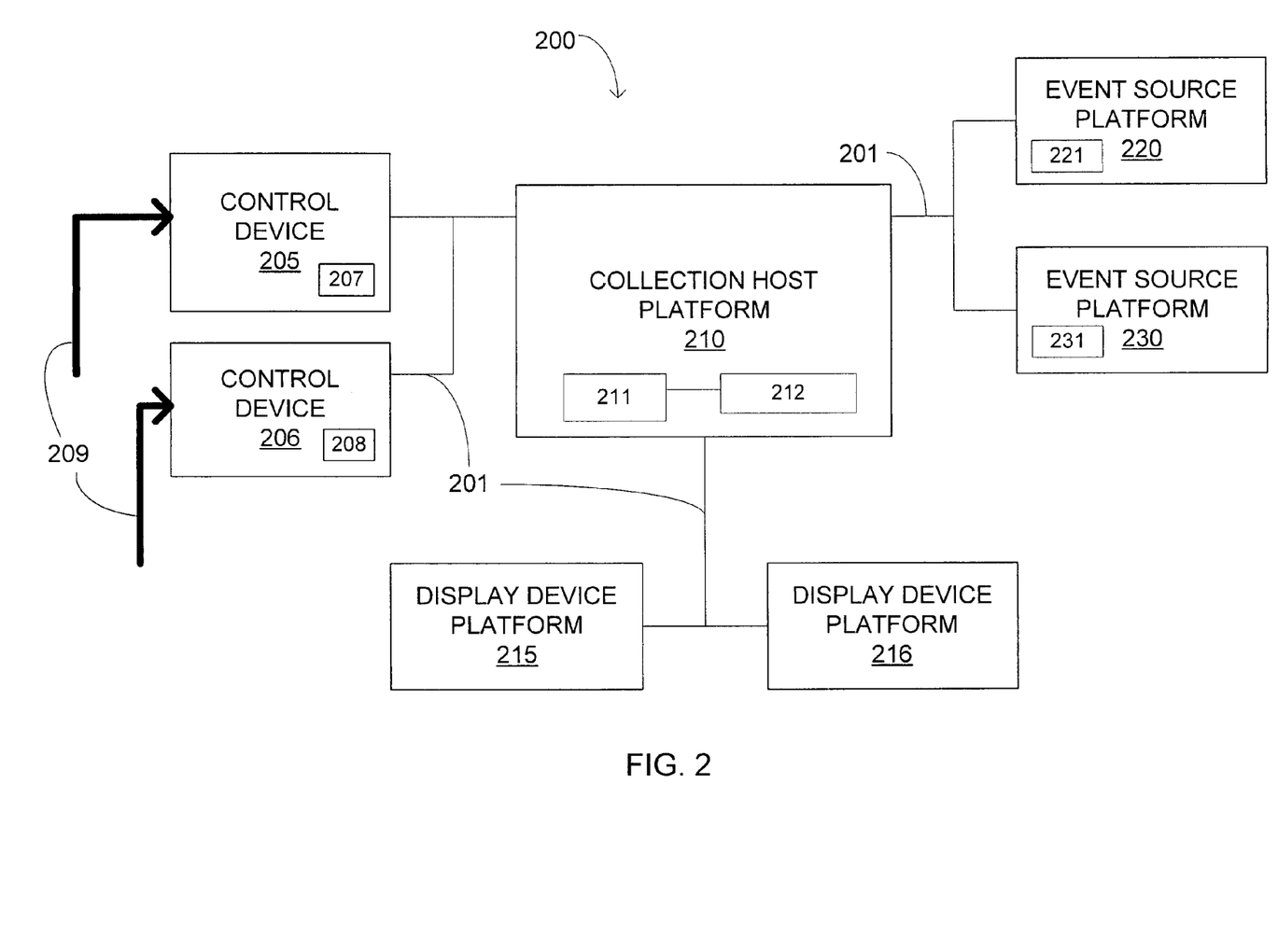
FIG. 2 is a block diagram of a system for configuring mobile agent objects for message collection, for collecting messages at a collection host platform from event source platforms, and for redirecting messages to destination platforms according to an embodiment of the invention.

FIG. 2 is a block diagram of a system 200 for configuring mobile agent objects for message collection, collecting messages at a collection host platform from event source platforms; and redirecting messages to destination platforms according to an embodiment of the invention. The system 200 includes several computing environments and/or platforms (similar to the first 100 and second 150 computer systems of FIG. 1) coupled by network connections 201. The network connections 201, as in FIG. 1, may be the internet 125 that use standard TCP/IP communications.

The platforms coupled by the network connections 201 in the system 200 include control device platforms 205 and 206, a collection host platform 210, event source platforms 220 and 230, and display device platforms 215 and 216. The system 200 may include one or more of each of the above-mentioned platforms with each platform operable to host a mobile agent object within one or more mobile-agent runtime environments 160 running therein, respectively. Each platform is described in greater detail below.

A plurality of control device platforms 205 and 206, usually remote from the collection host 210, typically comprise desktop PCs, server computers, or mobile devices capable of wireless or wired communications over the network connection 201. A control device platform 205 or 206 serves as the origin of a mobile agent object to be used for message filtration and collection. As such, a control device platform 205 and 206 is differentiated from other platforms by the inclusion of a mobile-agent-object toolkit 207 or 208.

A mobile-agent-object toolkit 207 or 208 is a set of software routines for dispatching custom-made or pre-created mobile agent objects which exist in a mobile-agent-object toolkit library (not shown). Specifically, the mobile-agent-object toolkit 207 or 208 is used to create mobile agent objects which function as message filters, event triggers, and/or delivery mobile agent objects (described below) to be dispatched to a collection host platform 210 or event source platforms 220 and/or 230. Mobile-agent-object toolkits 207 and 208 typically only exist on control device platforms 205 and/or 206.

A mobile-agent-object toolkit 207 and 208 is used to configure a mobile agent object for message filtering and collection through user-entered control vectors 209. Control vectors 209 are realized by input methods such as touch pads, keyboards, or pointing devices coupled with appropriate control software, DTMF tones over a telephone translated by appropriate software into commands, voice enabled command interfaces, instant messaging protocols, custom-built control client software, and external automated systems. Control vectors 209 are characterized by their ability to translate external command protocols into digital commands understood by the mobile-agent-object toolkit 207 or 208. A method for mobile agent object configuration is described below in conjunction with FIG. 3.

Once a mobile agent object is configured, it may be delivered to another platform, such as the collection host platform 210. The collection host platform 210 is operable to host one or more mobile agent objects that are capable of moving from platform to platform according to each mobile agent object's programmed instructions. If a particular mobile agent object has been configured for message filtering, the mobile agent object typically passes to another platform, such as an event source platform 220 or 230 to collect relevant messages. If, however, the particular mobile agent object has been configured for host message collection and/or message redirection, the mobile agent object, called a delivery mobile agent object 212, typically remains resident in the collection host platform 210.

The collection host platform 210 also includes an associated message database 211 suitable for storing digital representations of messages. As such, when a mobile agent object executing on an event source platform 220 or 230 sends a relevant message to the collection host platform 210, the delivery mobile agent object 212 executing on the collection host platform 210 facilitates the storage of the relevant message in the message database 211 and/or the subsequent redirection of the message to be delivered to another platform, such as a display platform 215 or 216 or to a control platform 205 or 206. A method for message redirection is described below in conjunction with FIG. 5.

Event source platforms 220 and 230 are capable of receiving, through any number of communications channels and protocols, messages intended for a user with access to the event source platforms 220 and 230. An event source platform 220 or 230 may be, for example, a voice-message system for a mobile telephone, a remote email address accessible via POP3 protocol, an FTP address, etc. Event source platforms 220 and 230 are characterized by their ability to translate received messages into a digital format that can be read, translated, and transferred by mobile agent objects 221 and 231. As such, when a message is received at an event source platform 220 or 230, a mobile agent object 221 or 231 running thereon filters to the received message to determine if the message is relevant. Relevancy can be any user-programmed parameter, such as message source, subject matter, time and date stamp, etc. If relevant, the message is passed on to the collection host platform 210. A method for message collection is described below in conjunction with FIG. 4.

The system 200 further includes a plurality of display device platforms 215 and 216 which are platforms capable of displaying a representation of the original message as received by one of the event source platforms 220 or 230. Often display device platforms 215 and 216 also have the capabilities of control device platforms 205 and 206. Examples of display device platforms 215 and 216 include fax machines, desktop PCs, network printers, and mobile telephones with display screens. When messages are redirected by the collection host platform 210, they are often sent to one or more display device platforms 215 and 216.

Figure 3:
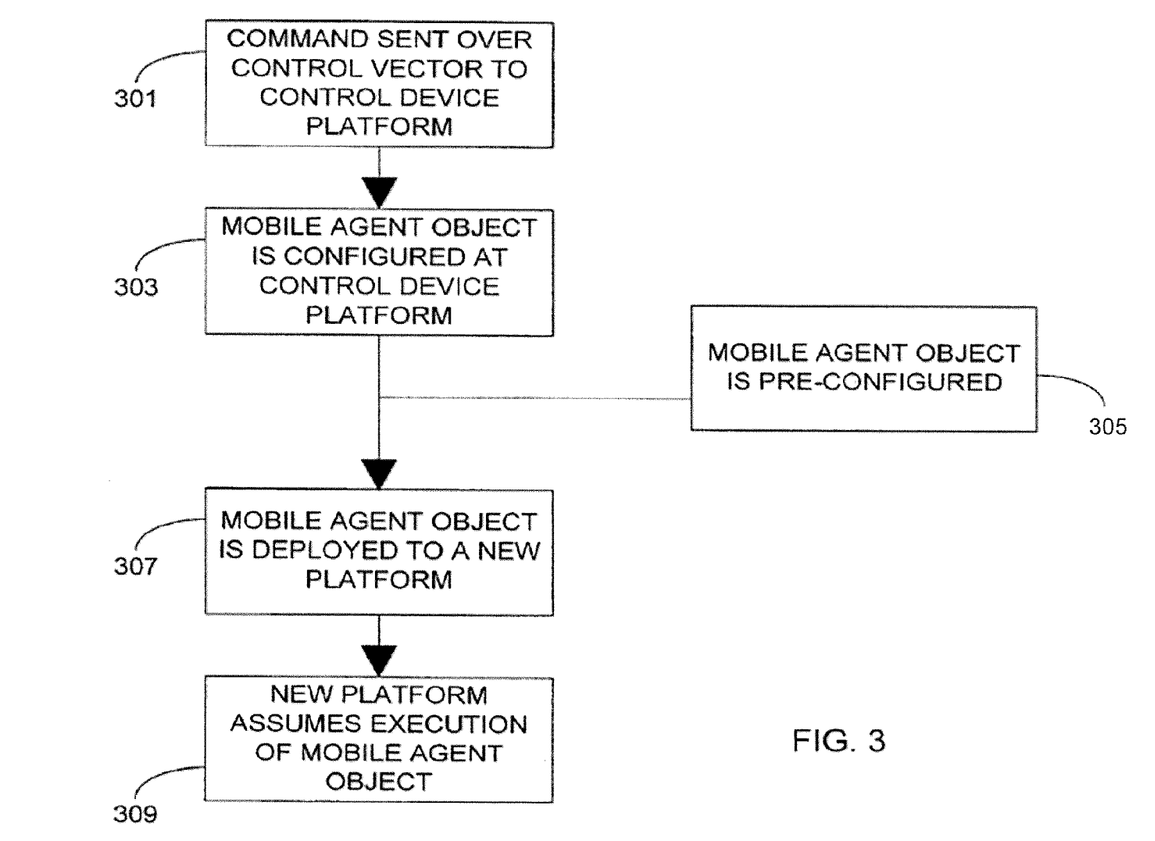
FIG. 3 is an illustration of a method for configuring a mobile agent object to filter and collect messages.

FIG. 3 is an illustration of a method for configuring a mobile agent object for the filtration and collection of messages. The method is a process by which mobile agent objects representing message filters and event triggers are configured and then dispatched to a collection host platform 210 and/or event source platforms 220 and 230.

At step 301, a command is sent over a control vector 209, to a mobile-agent-object toolkit 207 or 208 with instructions to configure a mobile agent object. The control vector contains a set of instructions that configures a mobile agent object with a plurality of event triggers and a plurality of message property requirements that together comprise a filter. An event trigger is a set of instruction that allows a mobile agent object to recognize the occurrence of an event, such as, the receiving of an email at an event source platform 220 or 230. A message property requirement is a parameter or characteristic of a message that the mobile agent object may scrutinize to determine if the message is to be passed on to the collection host platform 210. Examples of message property requirements include the recipient identification, the subject matter of the message, the time and date stamp of the message, etc.

The mobile agent object is then configured at step 303 with appropriate event trigger and message property requirements as well as a delivery address where messages which pass the filter are to be delivered. Alternatively, a pre-configured mobile agent object may be selected, at step 305, from a mobile-agent-object database (not shown) that is local to one of the control device platforms 205 or 206.

Next, at step 307, depending on the intended function of the configured mobile agent object, the agent is deployed to a event source platform 220 or 230 to become a constituent of the resident event trigger/filtering agency, i.e., mobile-agent-object environment 221 or 231, or is deployed to a collection host platform 210 to become a constituent of the resident delivery agency, i.e., mobile-agent-object environment 212. In the case of an event source platform 220 or 230, the mobile agent objects dispatched are those that are configured to serve message filtration and collection purposes. In the case of a collection host platform 210, the mobile agent objects dispatched are configured to serve message redirection and storage purposes. Finally, at step 309, the particular platform (collection host platform 210 or event source platform 220/230) takes over execution of the mobile agent object within their respective agencies 212 or 221/231.

Figure 4:
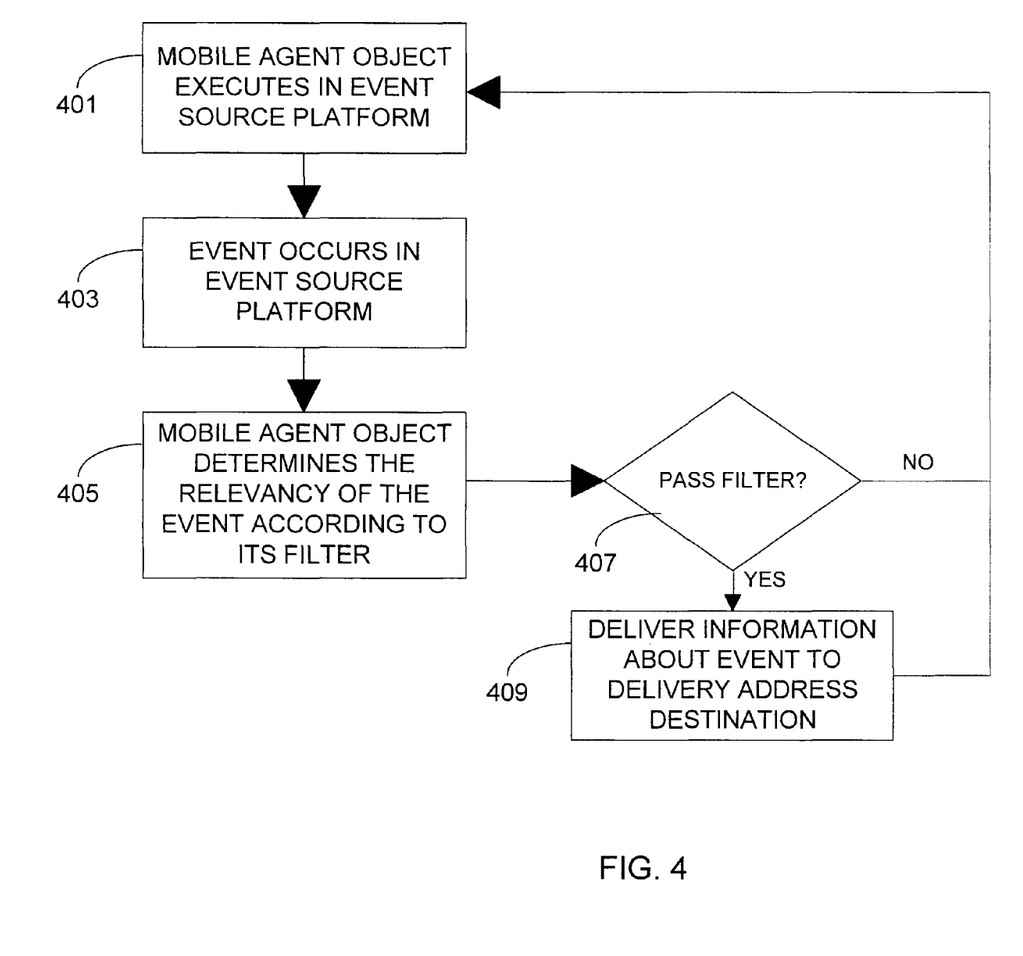
FIG. 4 is an illustration of a method for the filtration and collection of messages received by an event source platform.

FIG. 4 is an illustration of a method for the collection of messages received by an event source platform 220 or 230. In this method, mobile agent objects, configured using the configuration method of FIG. 3, work together to filter and collect messages at event source platforms 220 and 230 which meet a particular requirement of a user. The requirements are encoded as the event triggers and message properties contained within the mobile agent objects from configuration. Once determined to be relevant, i.e., filtered, messages are sent to a collection host platform 210 and stored in a message database 211 for later retrieval by a redirection method described below with respect to FIG. 5.

To begin, the method of FIG. 4 a mobile agent object executes in an event source platform 220 or 230 at step 401. During execution, the configured mobile agent object monitors the activity of the event source platform 220 or 230 for particular events according to its configured instructions as defined by the plurality of event triggers encoded therein. When an event occurs on the event source platform 220 or 230, at step 403, the mobile agent object is triggered if the event is one of the mobile agent object's trigger events. Events that can trigger a mobile agent object include, but are not limited to, the insertion of a mobile agent object into a platform, a timer event, and/or the reception of a new unfiltered message into the platform.

As such, at step 405, if the mobile agent object is triggered, then the mobile agent object determines if the event is relevant by passing the message through its filter as defined by its message property requirement encoded therein. That is, the mobile agent object determines if the event, (the receiving of a message, for example) passes its filter, (the recipient being a particular user, for example).

At step 407, if the event is not relevant, then the mobile agent object discards the message and continues executing on the event source platform 220 or 230 (back to step 401). If, however, the mobile agent object determines that the event is relevant, then information about the event is assembled and delivered to a platform corresponding to the mobile agent object's programmed delivery address. The platform corresponding to the delivery address is typically a collection host platform 210, but may be any platform suitable to receive information about events collected by a mobile agent object. Once the information is sent to the appropriate platform, the mobile agent object continues to execute on the event source platform 220 or 230 while monitoring future events (back to step 401).

Figure 5:
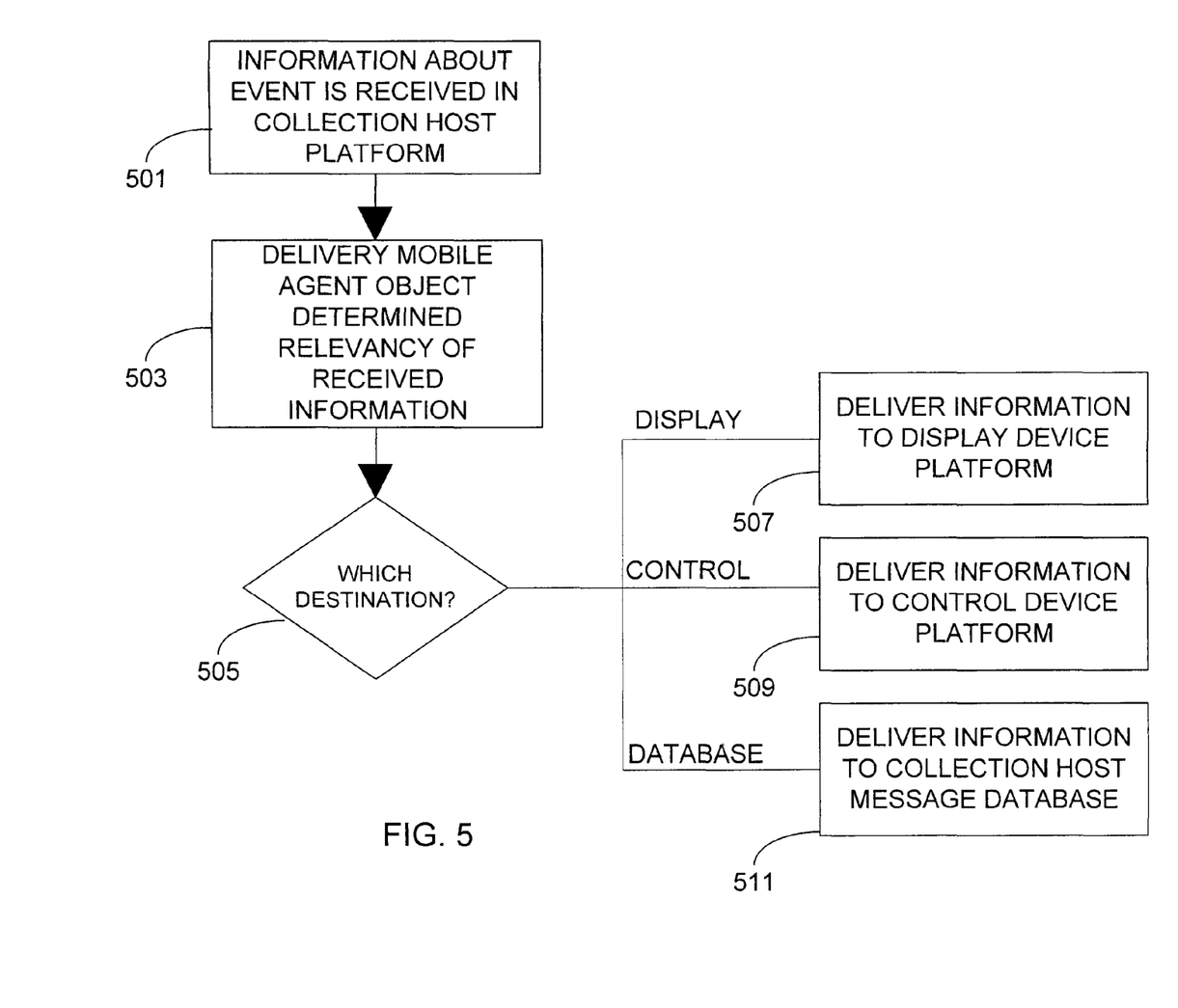
FIG. 5 is an illustration of a method for the redirection of messages received at a collection host platform from mobile agent objects in event source platforms.

FIG. 5 is an illustration of a method for the redirection of messages received at a collection host platform 210 from mobile agent objects executing in event source platforms 220 or 230. At step 501, an event occurs which is important to a constituent, i.e., a delivery mobile agent object, of the delivery agency 212, causing the process encoded in the constituent to execute. For example, a message may be received from mobile agent object 221 or 231 executing on an event source platform 220 or 230. Alternatively, the event may be a message database 211 search request from a control device platform 205 or 206.

When an event occurs, the delivery mobile agent object determined the relevancy of the event according to its configured parameters at step 503. Events that trigger constituents of a delivery agency 212 include, but are not limited to, the insertion of a mobile agent object into a platform, a timer event, the reception of a new message into the message database 211, and/or external commands conforming to externally-defined protocols issued by a control device platform 205 or 206. For example, the event may trigger a delivery mobile agent object to parse a message to determine (according to its filter instructions, at step 505) whether to send the message to a display device platform 215 or 216 at step 507, to a control device platform 205 or 206 at step 509, or to message database 211 on the collection host platform 210 at step 511. Alternatively, the event may trigger the delivery mobile agent object to deliver a message to more than one destination.

The preceding discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

I claim:

1. A method for collecting message objects using a mobile agent object, the method comprising:
    configuring a mobile agent object at a control device platform;
    delivering the mobile agent object to an event source platform;
    receiving a plurality of message objects at the event source platform, the message objects being generated by a user able to access the event source platform;
    filtering the received message objects with the mobile agent object executing in the event source platform to determine a filtered set of message objects, the mobile agent object operable to execute in a first electronic device, halt execution in the first electronic device at an execution state, be transplanted to a second electronic device, and resume execution from the execution state in the second electronic device;
    delivering the filtered message objects over a network to a collection host platform; and
    delivering the filtered message objects to a display device platform from the collection host platform via a network connection.

2. The method of claim 1, further comprising delivering the mobile agent object to the event source platform from the collection host platform via a network connection prior to the filtering.

3. The method of claim 1, further comprising delivering the mobile agent object to the event source platform via a network from a control device platform via a network connection prior to the filtering.

4. The method of claim 1, further comprising delivering the mobile agent object to a second event source platform from the first event source platform via a network connection prior to delivering the filtered message objects to the collection host platform.

5. The method of claim 1, further comprising delivering the filtered message objects to a control device platform from the collection host platform via a network connection.

6. The method of claim 1, further comprising storing the filtered message objects to a message database in the collection host platform.

7. The method of claim 1 wherein filtering is in response to an event trigger.

8. The method of claim 7 wherein the event trigger is the receiving of a message.

9. The method of claim 1 wherein the message objects comprise voice-mail messages.

10. The method of claim 1 wherein the message objects comprise electronic-mail messages.

11. The method of claim 1 wherein the message objects comprise digitally encoded text messages.

12. The method of claim 1 wherein the filtering comprises passing message objects to the filtered set of message objects that have a predetermined recipient.

13. The method of claim 1 wherein the filtering comprises passing message objects to the filtered set of message objects that have a predetermined subject matter.

14. The method of claim 1 wherein the filtering comprises passing message objects to the filtered set of message objects that have a predetermined source.

15. The method of claim 1 wherein the filtering comprises passing message objects to the filtered set of message objects that have a predetermined time and date stamp.

16. A method for collecting message objects from multiple event source platforms, the method comprising:
filtering message objects resident within a first event source platform with a first mobile agent object to determine a first filtered set of message objects, the message objects being generated by a user able to access the first event source platform;
sending the first set of filtered message objects over a network to a database in a collection host platform;
filtering message objects resident within a second event source platform with a second mobile agent object to determine a second filtered set of message objects;
sending the second set of filtered message objects to the database in the collection host platform, wherein the first mobile agent object is operable to execute in a first electronic device, halt execution in the first electronic device at an execution state, be transplanted to a second electronic device, and resume execution from the execution state in the second electronic device;
delivering the first and second sets of filtered message objects to a control device platform from the collection host platform via a network connection; and
delivering the first and second sets of filtered message objects to a display device platform from the collection host platform via a network connection.

17. The method of claim 16, further comprising delivering the first and second set of filtered message objects to a display device platform from the collection host platform via a network connection.

18. A method for managing message objects, the method comprising:
configuring a mobile agent object to execute in an event source platform and to identify and filter message objects received by the event source platform, the message objects being generated by a user able to access the event source platform, the mobile agent object operable to execute in a first electronic device, halt execution in the first electronic device at an execution state, be transplanted to a second electronic device, and resume execution from the execution state in the second electronic device;
assembling message objects identified and filtered by the mobile agent object in the event source platform;
delivering the identified and filtered message objects over a network to a collection host platform; and
redirecting the identified and filtered message objects from the collection host platform to a display device platform.

19. The method of claim 18 wherein the configuring further comprises configuring the mobile agent object to respond to a plurality of event triggers and to filter the events with a plurality of message property requirements such that the mobile agent object delivers information about a plurality of filtered events to a predetermined address in response to any one of the plurality of events matching predetermined conditions during the filtering.

20. A method for configuring a mobile agent object, the method comprising:
configuring a mobile agent object to filter an event and to deliver information about the event to a predetermined address in response to the event matching predetermined conditions during the filtering, wherein the predetermined address resides in a collection host platform coupled with the event source platform by a network connection;
delivering the mobile agent object over a network to an event source platform operable to execute the mobile agent object, the even being generated by a user able to access the event source platform, the mobile agent object operable to execute in a first electronic device, halt execution in the first electronic device at an execution state, be transplanted to a second electronic device, and resume execution from the execution state in the second electronic device, wherein the mobile agent object is configured in a platform other than the event source platform by a mobile agent object toolkit; and
delivering the filtered message objects to a display device platform from the collection host platform via a network connection.

21. The method of claim 20 wherein the event is a message being received by the event source platform.

22. The method of claim 20 wherein the platform other than the event source platform is a control device platform.

23. The method of claim 20 wherein the mobile agent object toolkit is controlled by a control vector initiated by a user of the platform.

24. A system having at least one computer processing unit and for collecting messages received at a plurality of event source platforms, the system comprising:
at least one electronic device comprising at least one event source platform operable to receive a plurality of events and having a mobile agent object executing therein, the events being generated by a user able to access the event source platform, the mobile agent object operable to filter the events in response to receiving the events, the mobile agent object further operable to execute in a first electronic device, halt execution in the first electronic device at an execution state, be transplanted to a second electronic device, and resume execution from the execution state in the second electronic device;
at least one electronic device comprising a collection host platform operable to receive over a network filtered events from the mobile agent object executing in the event source platform;
at least one electronic device comprising a control device platform operable to configure a mobile agent object and operable to deliver the mobile agent object to an event source platform; and
at least one electronic device comprising a display device platform coupled to the collection host platform and operable to display filtered events received from the collection host platform.

25. The system of claim 24 wherein the plurality of events comprise receiving at least one electronic mail.

26. The system of claim 24 wherein the plurality of events comprise receiving at least one voice mail.

27. The system of claim 24 wherein the plurality of events comprises receiving at least one digitally encoded test message.

28. The system of claim 24 wherein the at least one electronic device comprising a display device platform is a personal computer.

29. The system of claim 24 wherein the at least one electronic device comprising a display device platform is a fax machine.

30. The system of claim 24 wherein the at least one electronic device comprising a display device platform is a POP3 email account.

31. The system of claim 24 wherein the at least one electronic device comprising a display device platform is a mobile communication device.

32. The system of claim 24 wherein the control device platform further comprises a mobile agent object toolkit operable to configure a mobile agent object in response to a control vector initiated from a user of the control device platform.

33. The system of claim 32 wherein the at least one electronic device comprising a control device platform comprises a personal computer.

34. The system of claim 32 wherein the at least one electronic device comprising a control device platform comprises a server computer.

35. The system of claim 32 wherein the at least one electronic device comprising a control device platform comprises a touchpad device.

36. The system of claim 32 wherein the at least one electronic device comprising a display device platform comprises a mobile communication device.

37. The system of claim 24, further comprising an event database resident in the collection host platform, the event database operable to store filtered events received by the collection host platform.

38. A computer-readable medium including a mobile agent object operable to execute in a first electronic device, halt execution in the first electronic device at an execution state, be transplanted to a second electronic device, and resume execution from the execution state in the second electronic device, the mobile agent object having computer-executable instructions for:

navigating to an event source platform, the mobile agent object being configured at a control device platform;

monitoring events that occur in the event source platform for a predetermined type of event;

if a predetermined type of event occurs; filtering the predetermined type of event to determine if the event matches a predetermined parameter, the event being generated by a user able to access the event source platform;

if the event matches the predetermined parameter, sending information about the event over a network to a collection host platform; and delivering the information to a display device platform from the collection host platform via a network connection.

39. The medium of claim 38 wherein the predetermined type of event is the receiving of a message object in the event source platform.

40. The medium of claim 38 wherein the predetermined types of events are configured according to an event trigger set of instructions.

41. The medium of claim 38 wherein the predetermined parameter is configured according to a set of message property requirements.

* * * * *